(12) United States Patent
Popoveniuc et al.

(10) Patent No.: US 10,263,789 B1
(45) Date of Patent: Apr. 16, 2019

(54) AUTO-GENERATION OF SECURITY CERTIFICATE

(71) Applicant: AMAZON TECHNOLOGIES, INC., Seattle, WA (US)

(72) Inventors: Stefan Popoveniuc, Bethesda, MD (US); Nicholas James Lynch, Seattle, WA (US); Preston Anthony Elder, III, Fairfax, VA (US); Param Sharma, Haymarket, VA (US); Todd Lawrence Cignetti, Ashburn, VA (US); Dmitry Berkovich, Redmond, WA (US); Iftach Ragoler, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 15/083,060

(22) Filed: Mar. 28, 2016

(51) Int. Cl.
*H04L 29/06* (2006.01)
*H04L 9/32* (2006.01)
*H04L 9/30* (2006.01)

(52) U.S. Cl.
CPC .............. *H04L 9/3263* (2013.01); *H04L 9/30* (2013.01)

(58) Field of Classification Search
CPC ................................. H04L 9/30; H04L 9/3263
See application file for complete search history.

(56) References Cited

U.S. PATENT DOCUMENTS

| | | | | |
|---|---|---|---|---|
| 7,873,827 B2* | 1/2011 | Miyazawa | ........... | H04L 63/0823 713/156 |
| 2005/0076203 A1* | 4/2005 | Thornton | ............ | H04L 63/0823 713/156 |
| 2012/0030469 A1* | 2/2012 | Hsueh | ................. | H04L 63/0823 713/175 |

* cited by examiner

Primary Examiner — Tri M Tran
(74) Attorney, Agent, or Firm — Blank Rome LLP

(57) ABSTRACT

A service provider network includes a certificate manager that auto-generates and auto-renews security certificates for customers of the provider network. The security certificates may be usable to implement a Secure Sockets Layer (SSL) protocol, or other types of security protocols. The certificate manager generates a public key, private key pair for the customer, generates the certificate signing request (CSR) on behalf of the customer, transmits the CSR to the certificate authority (CA), and binds the resulting CA-generated certificate and private key to whatever internet-facing service the customer chooses (e.g., a load balancer).

21 Claims, 5 Drawing Sheets

US 10,263,789 B1

AUTO-GENERATION OF SECURITY CERTIFICATE

BACKGROUND

Internet domain owners can create a website for their domains and, if desired, impose a security overlay on the website. An example of such security is the Secure Sockets Layer (SSL). SSL defines a protocol by which the domain owner obtains a certificate from a trusted Certificate Authority (CA). The certificate is then used when a client of the website attempts to establish a connection to the website. The certificate may be accessed by the client's browser and used to confirm that the website is valid. Specifically, the client browser checks that the certificate has not expired, that the certificate was issued by a trusted CA, and that the certificate is being used by the website for which the certificate was issued. If the browser fails to verify any these checks, the browser may display a warning to the user of the client browser that the website is not secured by SSL. Otherwise, if all of these checks are passed, a visual indicator is provided in the client browser (e.g., a lock symbol) that the website is secure and can be trusted.

Generation of the SSL certificate is a multistep process that may be beyond the technical knowledge of many website owners. Further, SSL certificates are valid for a certain period of time that typically is fairly long. Certificate expiration dates one or two years into the future are commonplace. The website owner should renew the certificate before it expires, but given the certificate's long lifetime, it is easy for the renewal date to be forgotten by the website owner. If the certificate were to expire without being renewed, the website would no longer be protected by SSL and clients may not want to access unsecure websites.

BRIEF DESCRIPTION OF THE DRAWINGS

For a detailed description of various examples, reference will now be made to the accompanying drawings in which.

DETAILED DESCRIPTION

Figure 1:
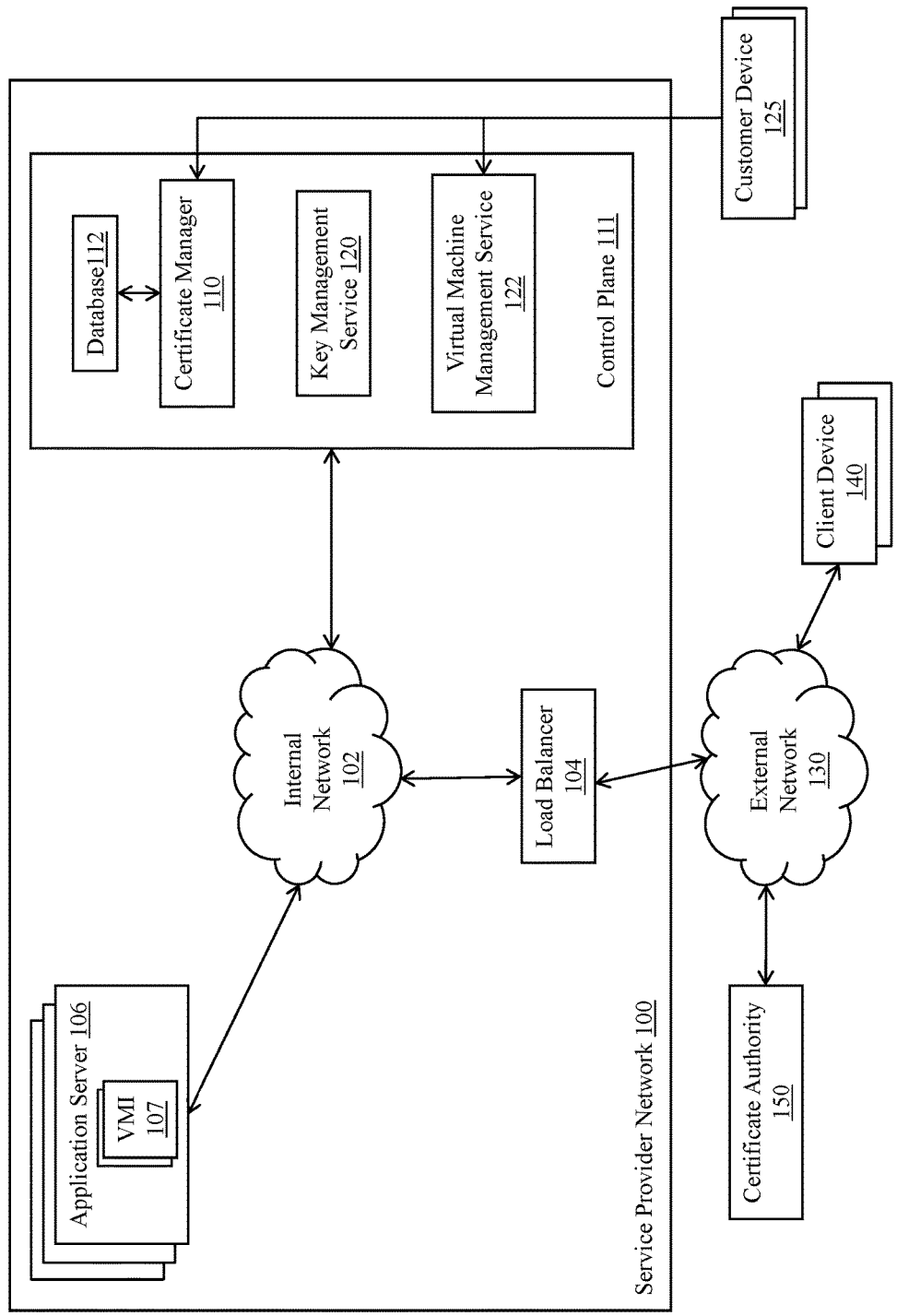
FIG. 1 shows a system in accordance with various examples.

As noted above, the process of creating an SSL certificate can be complicated and thus outside the comfort zone of many website owners. Advances in virtualization technologies have created large service provider networks that provided hardware and software for use by customers of such provider networks. Customers are able to create virtual machines for their exclusive use in executing the customers' own software. The customer thus need not own and operate its own servers and related network devices and, instead rent access to the service provider's server and related infrastructure. In accordance with an embodiment, the service provider network includes a certificate manager that assists the customer in the generation of the certificate. The customer requests that the certificate manager generate a certificate, and generally the certificate manager performs the rest of the operations necessary to have the certificate generated.

For instance, a service provider customer may access the certificate manager such as through a console interface or by way of application program interface (API) calls. Through the certificate manager, the customer requests a security certificate (e.g., an SSL certificate) to be generated on behalf of the customer. The certificate manager may verify ownership of the customer's domain (i.e., verify that the domain is owned by that particular customer) and generate a public key, private key pair. The certificate manager also may generate a request for a certificate to be sent to a certificate authority (CA). In some embodiments (e.g., SSL), the request for the certificate may be implemented as an SSL certificate signing request (CSR). The CSR may include the public key as well as information specific to the customer and/or the customer's domain. The CA generates a suitable certificate in response to receiving the CSR and transmits the certificate back to the certificate manager.

The certificate manager stores the certificate received from the CA in a database on behalf of the customer and has the private key encrypted. In some embodiments, a key management service is available to encrypt the private key upon request by the certificate manager. The encrypted private key is then stored in the database along with the customer's certificate.

The customer can then elect to use the certificate to enhance the security of the customer's website being hosted on the service provider network. The customer can login to a service within the service provider network and request that that service be permitted to use the certificate. The service, for example, may be a load balancer instance created by, or on behalf of, the customer. The load balancer is Internet-facing and receives traffic destined for the customer's website. The load balancer distributes the traffic to one or more back-end application servers that host the customer's website. The customer may want the traffic between the internet and the load balancer to be secured such as through SSL. Thus, the customer may access his load balancer instance and request that the previously-generated certificate be assigned to the load balancer. The certificate is then retrieved from the database and provided to the load balancer along with the private key, which may be an encrypted private key. The load balancer is granted permission to decrypt the private key for its subsequent use.

When a client of the customer's website desires to access the website, the client requests a secure communication link to be established. The load balancer responds to the request by providing the certificate to the client. The client verifies that the certificate has not expired, that the certificate was issued by a trusted CA, and that the certificate is being used by the website for which the certificate was issued. If all three checks are confirmed, a session key is generated and shared between the client and the website (i.e., the customer's load balancer which is a proxy for the website) based on the public key, private key pair. The session key is used to encrypt traffic between client and website. The client now has established a communication link to the website through the load balancer and has a high degree of trust that the link is secure.

The certificate manager takes on most of the responsibility involved with the generation of the certificate thereby reducing the burden on the part of the domain owner to do so. The domain owner need only request the generation of a certificate and confirm his authenticity when prompted to do so. The certificate manager and the CA take care of the rest of the operations to generate the certificate. The customer can then choose a particular service to use the certificate generated for the customer. The customer can bind the certificate to one service or to more than one service concurrently or sequentially as desired, and the same service can have multiple certificates bound to it. The customer may subsequently cancel the service or request the certificate not to be used by the service. In either case, the certificate manager can remove the binding between the certificate/private key and the service. As a result, the service is no longer able to use the certificate or the private key.

Further, to the extent that the certificate may be valid for a predetermined period of time, the certificate manager may specify that the lifetime (e.g., expiration date) when it submits the CSR. Because the certificate manager is aware of the expiration date, the certificate manager can cause the certificate to automatically be renewed before its expiration date. The customer, therefore, need not keep track of the expiration date—the service provider network, and specifically the certificate manager, does so instead for the customer.

FIG. 1 shows an example of a service provider network 100 in accordance with various embodiments. The service provider network includes an internal network 102, a load balancer 104, a plurality of application servers 106, and a control plane 111. Additional components may be included as desired. The internal network includes switches, routers, and other types of networking devices through which the various application servers 106, load balancer 104 and components of the control plane 111 can communicate with each other.

Each application server 106 comprises one or processors, memory, network interfaces, and other hardware components on which machine instructions can execute. The application server also may have various software components such as an operating system, hypervisor, network drivers, etc. In some embodiments, through interaction with the control plane 111, customers of the service provider network 100 can have the control plane 111 create virtual machine instances 107 on applications servers 106 on behalf of the customer.

The control plane 111 includes various components that customers of the service provider network 100 can access. Such components of the control plane 111 may include a certificate manager 110 and associated database 112, a key management service 120, and a virtual machine management service 122. Each of the certificate manager 110, the associated database 112, the key management service 120, and the virtual machine management service 122 may include software that is executed on a computing device. The control plane 111 may include one computer or multiple computers on which the various control plane components execute. Customers can access the control plane 111 by way of one or more customer devices 125. A customer device 125 may include a personal computer, a tablet device, a smart phone, or any other type of internet-access computing device.

Through the customer device 125, a customer can register with the service provider network 100, create and manage virtual machine instances, create and manage load balancers, enable/disable security, etc. For example, a customer may want to have his or her website hosted on the service provider network 100. The customer may access the virtual management service 122 to submit requests to have one or more virtual machine instances 107 launched on behalf of the customer. The virtual machine instances 107 may all be launched on the same physical application server 106 or on separate servers. Each virtual machine instance 107 is used exclusively by the customer that requested its creation.

A virtual machine instance (also referred to as a virtual machine) is a virtualized computer system, or a software implementation of a physical computer system. Virtual machines may provide for multiple and/or different operating system environments to run concurrently on a single server 106 having a processor and memory. In one example, multiple virtual machines of a Linux® operating system environment may execute concurrently with multiple instances of a Microsoft® Windows® operating system environment on a single physical computer. A virtual machine may include or interact with a hypervisor or a virtual machine monitor (or other type of virtualization system) which are programs that execute on the physical computer that allow multiple guest operating systems to share a single hardware host. Each operating system appears to have exclusive access to the host's processor, memory, and other resources. However, the hypervisor controls the host processor and resources, allocating what is needed to each instance's operating system in turn and making sure that the guest operating systems of the virtual machines cannot disrupt each other. Each virtual machine is controlled by a respective customer, who has access only to its own virtual machines and no access to the virtual machines of other customers, even virtual machines of other customers executing on the same physical server 106.

Once the customer's virtual machine instances 107 are created, the customer can load each virtual machine instance with whatever customer-specific applications the customer so chooses. The customer's applications may comprise web server applications, data processing applications, or any other type of back-end functionality that the customer wants to provide to that customer's clients.

Based on client volume, a customer may need multiple virtual machine instances 107 all executing the same customer application. For example, a customer may have a high enough demand for the products it sells that one order processing application running on one virtual machine instance may not be able to handle the volume of orders. Accordingly, the customer may request the virtual machine management service 122 to instantiate multiple copies of the same order processing application running on multiple instances of similarly configured virtual machines. Further, to balance the load (e.g., order requests) among the customer's multiple virtual machine instances 107, the customer also may request the virtual machine management service 122 to create a load balancer 104 for that customer, and map the load balancer to the customer's virtual machine instances 107. The load balancer 107 may comprise software executing on a computing device. The virtual machine management service 122 may create a load balancer that is used exclusively on behalf of the customer to receive network traffic intended for the client's website, selects one of the customer's virtual machine instances 107 to process a given traffic request, and then forwards the request to the target virtual machine instance.

The customer may be assigned a public internet protocol (IP) address. The public IP address is mapped to the load balancer by the virtual machine management service 122. All traffic coming into the service provider network with that particular IP address as the destination address is provided to the load balancer 104 to which the IP address was mapped. The load balancer 104 also is programmed with private IP addresses of the application servers 106 on which the customer's virtual machine instances 107 are being hosted. After selection of the particular virtual machine instance 107 to receive an incoming request, the load balancer 104 may replace the destination IP address in the packet header with the private IP address of the target application server.

Referring still to FIG. 1, various client devices 140 can access the customers' provider network-hosted services through the external network 130. The client devices 140 may include personal computers, tablet device, smart phones, or any other type of computing devices. A client device may have a web browser executing thereon to permit a user of the client device to access the customer's service. The external network 130 may include one or more of local area networks, wide area networks, wired networks, wireless networks, the Internet, etc. A certificate authority (CA) 150 also is shown in FIG. 1. The CA 150 refers to the computing system employed by the certificate authority to respond to certificate signing requests and to generate the certificates. The CA 150 may comprise a computing device that can be accessed by the service provider network 100 through the external network. In some example embodiments the CA 150 could be operated by the service provider.

A customer may want for his or her website to provide a secure link to the customer's client devices 140. In accordance with an embodiment, the service provider network 100 may permit the customer to impose SSL security protection on the customer's internet-facing service to its customers. In the example of FIG. 1, this means that the communication between the customer's load balancer 104 and client devices 140 is protected by SSL. Of course, the customer may have other types of internet-facing services besides a load balancer, such as a content distribution network (CDN) and an API gateway. SSL can be imposed on those other service types as well. Further, other forms of security besides SSL can be implemented by the service provider network 100 on behalf of the customer, such as Transport Layer Security (TLS). The examples below refer to SSL and the use of a certificate to implement SSL, but other protocols and certificates besides SSL and its certificates can be implemented as well.

SSL is a security technology for establishing an encrypted communication link between a server (load balancer in some embodiments) and a client device. To be able to create an SSL connection, a server requires an SSL certificate. A certificate is created (and renewed periodically) and used by the server to prove authenticity and trustworthiness to a client device attempting to establish a connection to the server.

SSL certificates are generated by CAs 150. A CA is an entity that issues the certificates, and the certificates certify the ownership of a public key by the party named in the certificate. Because CAs are trusted, the certificates they generate also are trusted. In some cases, a browser executing on the client device requests an SSL connection to be established. In response, the server provides the certificate. The certificate may include the customer's name (e.g., owner of the domain to which the client device is attempting to connect), customer's address, an expiration date for the certificate, and details about the certificate authority itself. When the browser connects to a secure site, it retrieves the site's SSL certificate and checks that it has not expired, that the certificate was issued by a certificate authority trusted by the browser, and that the certificate is being used by the website for which it was issued. If any of these checks fail, the client browser will display a warning to the end user that letting the user know that the site is not secured by SSL.

Ordinarily, SSL certificates are generated in a process in which the domain owner is heavily involved. In accordance with the embodiments described herein, however, the certificate manager 110 takes on much of the effort to generate an SSL certificate for the customer of the service provider network 100.

Figure 2:
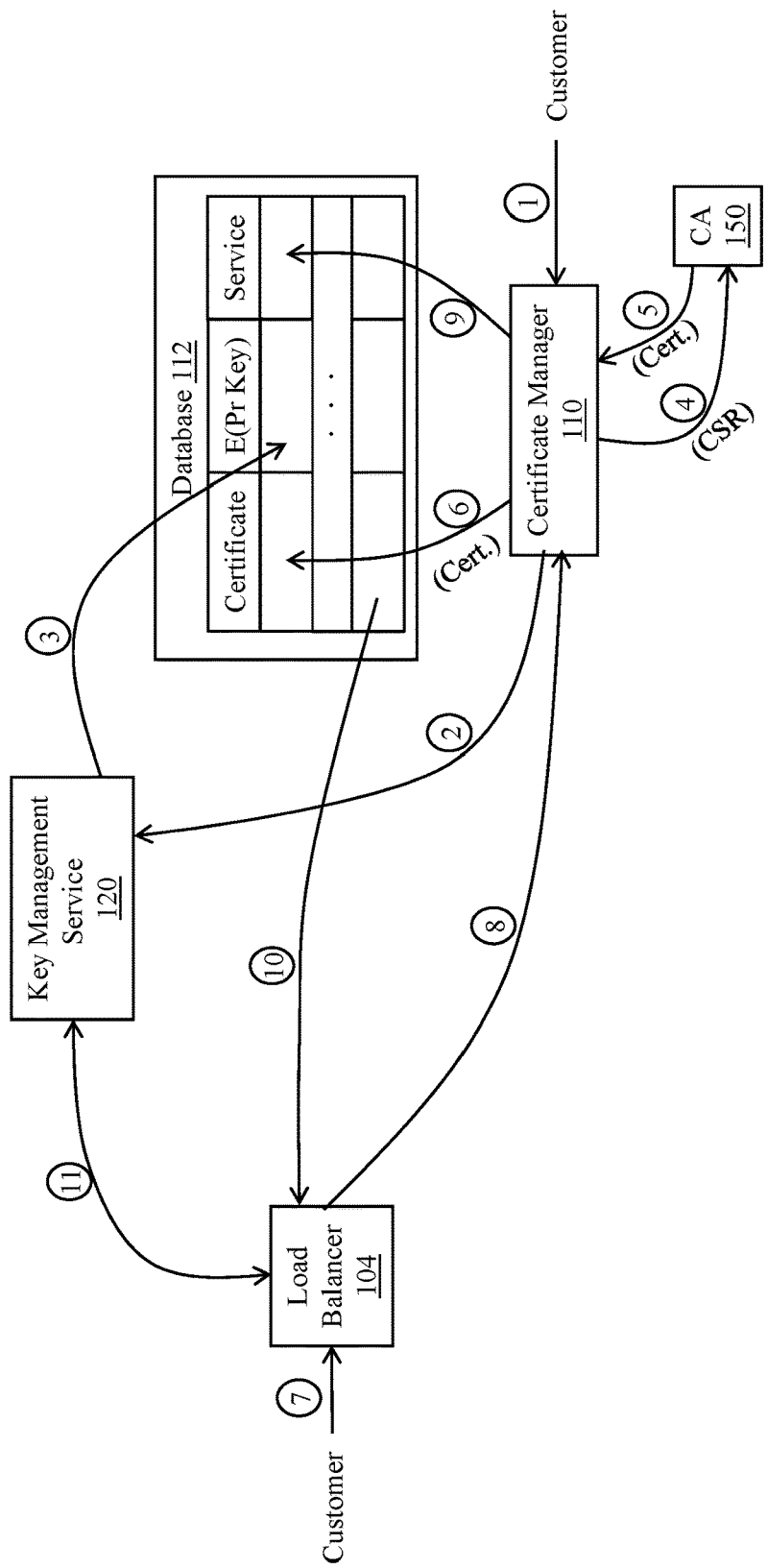
FIG. 2 illustrates a functional flow between a customer, certificate manager, database, key management service, and an internet-facing service in accordance with various examples.

The functional flow to generate a certificate for a customer is best illustrated in FIGS. 1 and 2. FIG. 2 shows some of the same components as illustrated in FIG. 1. FIG. 2 illustrates an example of a sequence of operations to generate the certificate for the customer and then bind the certificate to an internet-facing interface such as a load balancer 104. The circled numbers 1-11 in FIG. 2 illustrate the sequence of events.

A customer wants to add SSL security to his or website. At 1, the customer accesses the certificate manager 110 to request that a certificate be generated for the customer. The access may include the customer device 125 accessing a management console in the control plane 111. The management console may have a selectable security option that the customer can select (e.g., radio button, drop down menu, etc.). Alternatively, the customer may submit an application programming interface (API) call to the certificate manager 110 to request that an SSL certificate be created. Further still, the customer can interact with the certificate manager 110 by way of a command line interface (CLI) to request the generation of the certificate.

The request for a certificate is for a particular domain (presumably one owner and operated by the customer requesting the certificate). The certificate manager 110 may respond to the request for generation of the certificate by verifying the ownership of the domain. The verification process may include the certificate manager 110 generating and transmitting an email message to each of multiple different email addresses associated with the domain. For example, the email addresses may include the following prefixes for the domain: admin, administrator, postmaster, webmaster, and hostmaster (e.g., admin@example.com). Other email addresses may have been registered with the particular domain during a domain registration process. Each email may include an explanation and a link. The explanation may instruct the recipient of the email to click on the link to confirm their identity. The user clicks on the link in the email and a web page is displayed on the user's browser requesting the user to select a button if in fact the user is the person identified on the webpage. By clicking on the button on the webpage, a message is sent back to the certificate manager 110 thereby proving that the user requesting the certificate is the owner of the domain.

The certificate manager 110 also may generate a public key, private key pair for the customer, rather than customer doing so. The key pair is used to establish a session key between client and load balancer to encrypt traffic therebetween. At 2, the certificate manager 110 may submit a request to the key management service 120 to encrypt the private key for storage in the database 112 (indicated as E(Pr Key) as indicated at 3. At this point, an entry for the customer's account has been created in the database 112 associated with the certificate manager 110 that includes the encrypted private key. The key used to encrypt the private is a service key generated by the key management service 120 for the customer and mapped to the customer's account. The service key of the key management service is partially under the control of the customer and partially under the control of the certificate manager 110. The customer can see that the service key exists, can view any policy associated with the service (e.g., lifetime, type of encryption protocol, etc.), and review and revoke grants created the service key, but the customer cannot directly use the service key to encrypt or decrypt anything. The service key remains in the customer's service provider network account, and the certificate manager 110 cannot use the service key without being given permission by the customer.

That the private key associated with the SSL certificate is encrypted and encrypted using a tightly controlled service key by the key management service 110 provides additional security for the private key. In the disclosed embodiments, the customer cannot view the private key itself and does not take possession of the private key (e.g., on the customer's own customer device 125). The private key is used by the certificate manager 110 on behalf of the customer in a highly secure manner with very little involvement by the customer, thereby reducing administrative hassle to the customer.

At 4, the certificate manager 110 sends a certificate signing request (CSR) to the CA 150. The CSR may include the public key generated by the certificate manager 110, as well as information specific to the party requesting the certificate (i.e., the service provider network customer wanting to include SSL protection for his website). Such information may include, for example, name and address. In some embodiments, the CSR may be generated in accordance Signed Public Key and Challenge (SPKAC) which is a format sending a CSR that encodes a public and which can be manipulated using OpenSLL.

At 5, the CA 150 returns a certificate back to the certificate manager 150, which the certificate manager then stores at 6 in the customer's entry in the database. The customer then has a certificate and, other than requesting the certificate and responding to an authentication request and approving use of his service key by the key management service 120, the customer was generally uninvolved in the certificate generation process. For example, the customer did not actively generate the CSR nor determine to which CA to send the CSR.

Upon creation of the certificate or at a later point in time, the customer may choose to have the certificate applied to its interface facing interface such as the load balancer. The customer at 7 accesses the load balancer 104 and requests that the load balancer implement SSL (or other suitable security protocol) and use the previously-generated certificate. The customer may access the load balancer 104 through interaction with the virtual machine management service 122 (FIG. 1). That interaction may be by way of a management console, one or more APIs, a command line interface, or any other type of interface. The customer may authenticate himself to the load balancer through submission of a credential such as a password, biometric, etc. Once the customer is authenticated, the customer can select an option to have the certificate and corresponding private key used by the load balancer as indicated at 7 in FIG. 2). In some embodiments, the customer submits a request for access to the load balancer. The request may be a credential or a digital signature. The load balancer may be provisioned with its own set of security credentials, which allow it act on behalf of the customer. In such embodiments, the credentials are not authenticated per se. Rather, the credentials may be symmetric keys that are used to generate hashes of the requests and insert the hashes into the requests. The hashes are the digital signatures. The provider network may use its copy of the symmetric key to validate the hash. Matching hashes is a positive indication that the request is authentic. The request may include the customer requesting a "listener" at his public IP address at a port associated with security communications (e.g., port 443).

At 8, the load balancer 104 submits a request to the certificate manager to have the certificate manager bind the certificate and private key to the load balancer. The load balancer may prove to the certificate manager that the customer was successfully authenticated. In some embodiments, the load balancer may supply the credential that the customer submitted so that the certificate manger can re-confirm the credential. In other embodiments, the load balancer may be provisioned with credentials from the service provider that enable the load balancer to act on behalf of the customer. In this case, the load balancer may send a request, signed with the provisioned credentials, to the certificate manager 110, which can authenticate the request. At 9, the certificate manager binds the certificate to the load balancer by, for example, writing an identifier (or other type of relation value) of the service into the database entry associated with the certificate. Binding the certificate to the load balancer may thus entail creating an association in the database between the certificate and the load balancer and also may include generating or approving credentials for the load balancer to decrypt the private key. The certificate/encrypted private key are provided to the load balancer 104 at 10. The certificate manager 110 may read the certificate/encrypted private key from database 112 and provide them to the load balancer. The certificate manager grants permission to the load balancer to decrypt the private key, and at 11, the load balancer interacts with the key management service 120 to decrypt the encrypted private key. The certificate manager is not involved in the decryption process. The load balancer 104 may request the key management service 120 to decrypt the private key, and the key management service 120 decrypts the private key and provides the plaintext private key to the load balancer for use in subsequently establishing SSL connections.

A customer subsequently may cancel the load balancer 104 or may request that the certificate no longer be used by the load balancer. In the latter case, the certificate/private key may be deleted by the load balancer from its use or may not be deleted but marked as not being usable by the load balancer. The load balancer may submit a message to the certificate manager 110 to remove the binding. In response, the certificate manager 110 may delete the service identifier from the database 112 to thereby removing the binding. The certificate manager 110 also may inform the key management service 120 that permission has been revoked by the load balancer to have the certificate's private key decrypted.

Figure 3:
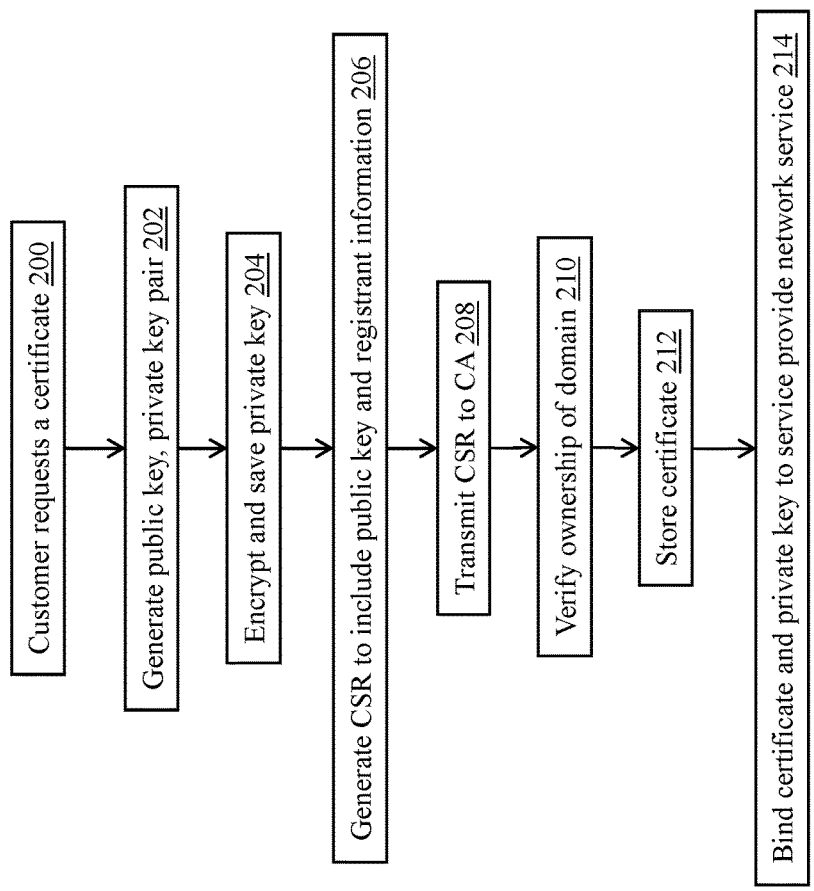
FIG. 3 shows a method for auto-generating a security certificate in accordance with various examples.

FIG. 3 shows a flow chart of a method in accordance with various embodiments to auto-generate a security certificate for a customer. The operations may be performed in the order shown, or in a different order. Further, the operations may be performed sequentially, or two or more of the operations may be performed concurrently. At 200, a customer requests a certificate to be created for the customer. As explained above, the certificate manager is largely responsible for coordinating the certificate generation on behalf of the customer.

At 202, the certificate manager 110 may generate a public key, private key pair. In some embodiments, the certificate manager 110 may request another service (e.g., the key management service 120) to generate the asynchronous key pair. At 204, the private key is encrypted by the key management service 120 and stored (e.g., in database 112).

The certificate manager 110 generates the CSR at 206. The CSR may include the public key, a lifetime value selected by the certificate manager, and customer-specific information (name, address, etc.). The CSR may be formatted in a prescribed manner as specified by the particular CA 150 to which the CSR is to be provided. The CSR is transmitted at 208 through the external network 130 to the target CA 150 where it is processed.

At 210, the ownership of the domain may be verified by the CA 150. Verification of the domain may include prompting the customer (e.g., by one or more emails messages) to verify that he or she has requested a certificate to be generated. The email may be displayed on the customer device 125 and the customer may select a uniform resource locator (URL) contained within the email message. The URL may cause a web page to be displayed that prompts the user to select a button or other type of user control to confirm that he or she has requested the certificate. In other embodiments, simply selecting the URL in the email may be sufficient to verify the domain.

Once verification of proper domain ownership is established, the CA generates and returns a CA associated with public key created at 204 and the certificate is stored at 212 in the database with the private key.

Figure 4:
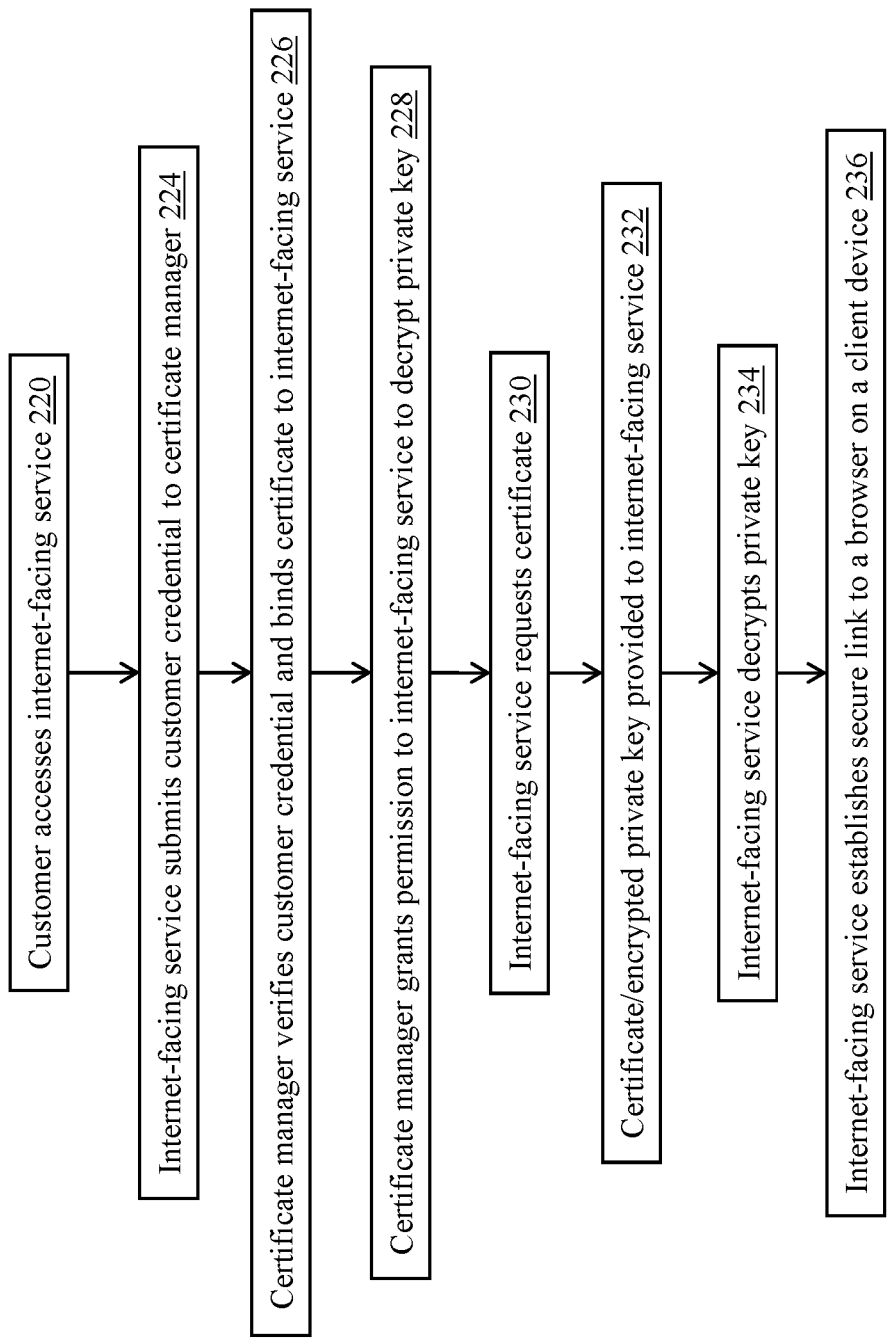
FIG. 4 shows a method for binding an auto-generated security certificate to an internet-facing service in accordance with various examples.

At 214, the certificate and private key may be bound to an internet-facing service of the service provider network 100 such as a load balancer 104. FIG. 4 provides detail as to an implementation of operation 214. The operations in FIG. 4 may be performed in the order shown, or in a different order. Further, the operations may be performed sequentially, or two or more of the operations may be performed concurrently.

At 220, the customer access the internet-facing service (e.g., console, API, CLI, etc.) and, if implemented submits a proper credential for verification of the customer. In embodiments in which the internet-facing service is a load balancer, the customer also may create a listener on a particular port (e.g., port 443) that causes the load balancer to request the certificate for the customer. The internet-facing service may submit a request to the certificate manager for the certificate (224). The request may include the customer-supplied credential.

At 226, the certificate manager verifies the credential and binds the certificate to the customer's internet-facing service This operation may include the certificate manager 110 updating the database entry for the certificate to include an identifier of the internet-facing service to thereby indicate that that the certificate is associated with that particular service. The certificate manager 110 also may grant permission to the internet-facing service to decrypt the private key at 228. Granting this permission may include the certificate manager 110 providing a message to the key management service 120 that the particular internet-facing service has permission to have the private key decrypted. In some embodiments, the internet-facing service decrypts the private key (230), while in other embodiments the internet-facing service requests another service such as the key management service 120 to perform the private key decryption.

At 230, the internet-facing service may request a copy of the certificate and, at 232, the certificate (including the encrypted private key) is retrieved from database 112 and transmitted to the internet-facing service. The internet-facing service may decrypt the encrypted private key (or otherwise request its decryption) at 234. The key management service 120 may decrypt the encrypted private key on behalf of the internet-facing service.

At 236, the internet-facing service establishes a secure link to a client device browser. This operation may include the internet-facing service transmitting the certificate to the client device browser for confirmation as explained above. The public key associated with the certificate also may be provided to the client device browser. Upon successful confirmation of the certificate, the client device browser may generate a session key, encrypt the session key with the public key and transmit the encrypted session key to the internet-facing service of the service provider network 100 (e.g., load balancer 104). The internet-facing service may decrypt the session key using the private key to recover the session key. At that point, both the client device browser and the internet-facing service have a symmetrical session key which they use to encrypt and decrypt communication packets therebetween.

A certificate may be bound by the certificate manager 110 to one internet-facing service or to multiple internet-facing services. Further, the same internet-facing service may have multiple certificates bound to it. All such binding relationships between internet-facing services and certificates are stored in the database 112 and updated by the certificate manager.

The CSR generated by the certificate manager 110 may include an expiration value. The expiration value indicates the valid lifetime for the certificate. Upon the expiration of the certificate, the certificate is no longer considered to be valid. One of the checks a client device browser may perform on a newly received certificate is to verify that the certificate has not already passed its expiration period. The expiration value may be a date certain, a date and time of day certain, or any other type of value to indicate a period of time. The expiration value also may be referred to as a lifetime value to indicate the valid lifetime for the certificate. The certificate manager 110 may impose any desired value for the expiration value. The value may be the same for all customers, or may vary from customer to customer.

Because the certificate manager 110 embeds the expiration value in the CSR, the certificate manger 110 is aware of the period of time for which each certificate is valid. Accordingly, the certificate manager 110 can schedule an auto-renewal of the certificate. In some embodiments, the certificate manager begins the renewal process in advance of the expiration time (e.g., an hour in advance, a day in advance, etc.). For example, certificate manager 110 can write a value to database 112 that can be used to initiate the auto-renewal process. The value could be a time stamp of when the auto-renewal should start or a time stamp of when the certificate was created, etc. The certificate manager 110 can verify that the customer's domain is still owned by the customer thereby precluding the CA 150 from having to do so. For example, if the certificate to be renewed is bound to a customer internet-facing service (e.g., a load balancer), then because the certificate manager 110 is part of a provider network that hosts the internet-facing service, the certificate manager 110 can verify ownership of the internet-facing service. In some examples, the certificate manager 110 may access a domain name service (DNS) to request the IP address to which the customer's domain resolves. If the DNS look-up provides the IP address of the customer's internet-facing service (an IP address to which the provider network and certificate manager 110 are aware), then the certificate manager thereby confirms that the domain of the internet-facing service is still owned by the customer.

In the case in which the certificate manager 110 can confirm ownership of the domain, the certificate manager 110 generates and transmits a CSR to the CA 150 that indicates that the domain has already been confirmed. Such CSRs may include a bit (bit field, flag, etc.) to indicate whether the domain has been confirmed. Upon receipt of the CSR with the bit indicating that the domain's ownership has been confirmed, the CA does not confirm the ownership and, instead, issues a renewal certificate.

However, if the certificate about to expire is not currently bound to a customer-controlled internet-facing service or, upon performing the DNS look-up noted above the IP address reported by DNS does not match the IP address of the internet-facing service to which the certificate is bound, then the certificate manager 110 cannot confirm ownership of the domain. In that case, the certificate manager 110 issues a CSR which does not have the aforementioned bit set to indicate domain ownership verification. The CA 150 in this case will perform domain ownership verification itself such as by sending emails to the admin, administrator, postmaster, webmaster, and hostmaster emails as explained previously.

In either case (whether the certificate manager can or cannot verify the domain itself), the certificate renewal process includes the certificate manager 110 forming and sending a new CSR to the CA 150 to have a new certificate generated, or to have the prior certificate resent with an updated expiration value. If the certificate manager 110 can verify ownership of the customer's domain, the customer need not be involved in the auto-renewal process. Upon receipt of the new certificate from the CA 150, the certificate manager 110 stores the renewed certificate in the database 112. If the certificate had been bound to a particular internet-facing service (e.g., load balancer 104), the certificate manager may provide the renewed certificate to that service, or send a message to the service that a renewed certificate is available. In the latter case, the internet-facing service can request a copy of the renewed certificate from the certificate manger and the certificate manager transmits the requested certificate to the service. The public key, private key pair may not change during the certificate renewal process in some embodiments, while in other embodiments, a new public key, private key is generated and used as described above.

Figure 5:
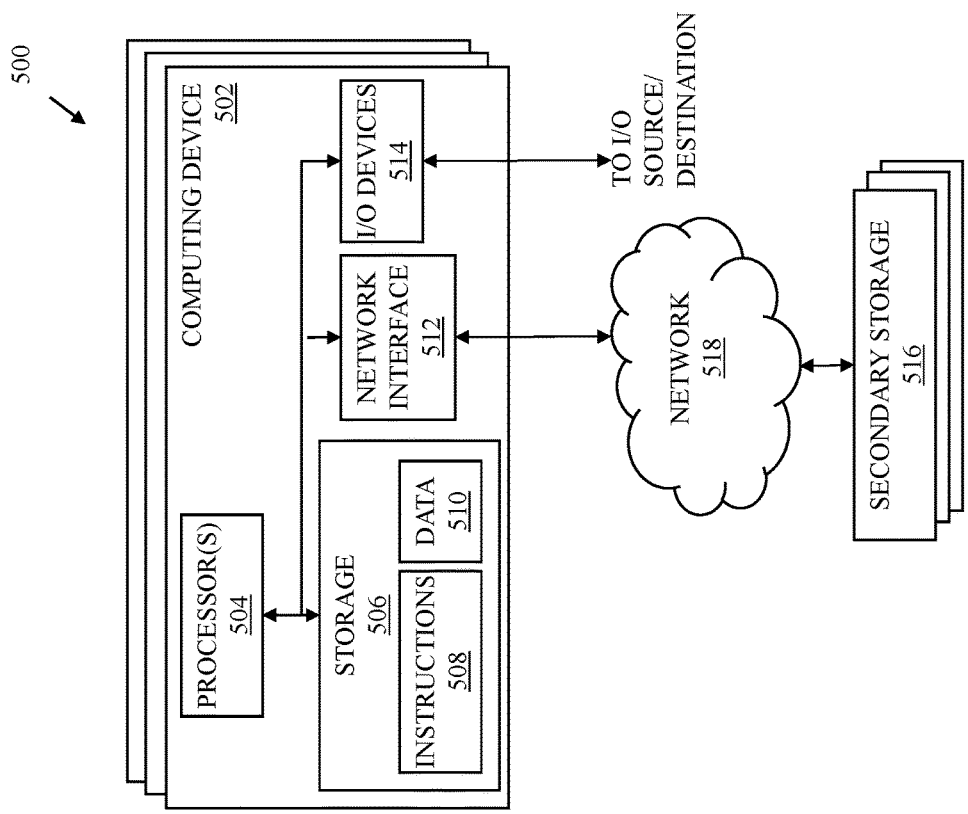
FIG. 5 is a block diagram of an example of a computing device usable to implement the services and functionality described herein.

FIG. 5 shows a schematic diagram for a computing system 500 suitable for implementation of the certificate manager 110, key management service 120, virtual machine management service 122, virtual machine instances 107, and load balancer 104 in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the certificate manager 110, key management service 120, virtual machine management service 122, virtual machine instances 107, and load balancer 104.

Each computing device 502 includes one or more processors 504 coupled to memory 506, network interface 512, and 110 devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the multi-user collaboration system 100 and/or the food ordering collaboration system 200, each of the computing devices 502 may implement the same ISA, or individual computing nodes and/or replica groups of nodes may implement different ISAs.

The storage 506 may include a non-transitory, computer-readable storage device configured to store program instructions 508 and/or data 510 accessible by processor(s) 504. The storage 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage 506. For example, instructions 508 may include instructions that when executed by processor(s) 504 implement the certificate manager 110, key management service 120, virtual machine management service 122, virtual machine instances 107, and load balancer 104 disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the certificate manager 110 and other components described herein may be implemented as a separate computing device 502 executing software to provide the computing node with the functionality described herein. In some embodiments, the certificate manager 110, key management service 120, virtual machine management service 122, virtual machine instances 107, load balancer 104 and other components may be implemented by the same computing node.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, wireless telecommunication networks, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

Those skilled in the art will appreciate that computing system 500 is merely illustrative and is not intended to limit the scope of embodiments. In particular, the computing system 500 may include any combination of hardware or software that can perform the functions disclosed herein, including computers, network devices, internee appliances, PDAs, wireless phones, pagers, etc. Computing device 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a plurality of computing devices configured to implement a service provider network;
at least one of the computing devices configured to implement a certificate manager and at least one of the computing devices configured to implement a virtual machine management service, wherein the virtual machine management service is configured to, responsive to a request from a customer device, create a plurality of virtual machine instances and a load balancer and attach the load balance to the plurality of virtual machine instances, wherein the load balancer is configured to select one of the plurality of virtual machines to process a traffic request received by the load balancer;
wherein the certificate manager is configured to:
receive a request from the customer device to generate a security certificate for a domain;
request generation of a public key, private key pair from a key management service on behalf of a service provider customer without involvement by the customer;
request encryption of the private key by the key management service;
without involvement by the customer, generate a certificate signing request containing the public key;
without involvement by the customer, transmit the certificate signing request to a certificate authority;
receive a certificate from the certificate authority; and
bind the certificate and the private key to the load balancer.

2. The system of claim 1, wherein the certificate manager is configured to include a lifetime value for the certificate in the certificate signing request and, without involvement by the customer, auto-renew the certificate before expiration of the certificate.

3. The system of claim 1, wherein the certificate manager is configured to verify ownership of the domain through transmission of a plurality of email messages to predetermined email addresses corresponding to the domain, each email message containing a link to a website for verification of ownership of the domain.

4. The system of claim 1, wherein the certificate manager is configured to receive a request from the load balancer, to authenticate the request, and to grant permission to the load balancer to decrypt the private key.

5. The system of claim 1, wherein the certificate manager is configured to remove the binding of the certificate and private key to the load balancer.

6. A system, comprising:
a plurality of computing devices configured to implement a service provider network including a load balancer;
at least one of the computing devices configured to implement a certificate manager, wherein the certificate manager is configured to:
confirm ownership by a customer of the service provider network of a domain of the load balancer implemented by the service provider network;
generate a private key without involvement by the customer of the service provider network;
request encryption of the private key by a key management service to produce an encrypted private key;
without involvement by the customer, generate a certificate signing request for a certificate authority;
receive a certificate from the certificate authority;
store the certificate and the encrypted private key in a data structure in a storage device;
bind the certificate and the private key to the load balancer; and
renew the certificate before it expires without involvement of the customer.

7. The system of claim 6, wherein the certificate manager is configured to generate a public key without involvement of the customer and include the public key in the certificate signing request.

8. The system of claim 6, wherein the data structure contains a plurality of entries, each entry including a certificate and a private key associated with a separate customer.

9. The system of claim 6, wherein at least one of the computing devices is configured to implement, based on a customer request, the load balancer to which the certificate and private key are bound.

10. The system of claim 9, wherein the load balancer is configured to receive the customer request and submit a message to the certificate manager to bind the certificate and private key to the load balancer.

11. The system of claim 9, wherein upon receipt of a request to remove a listener on a port for which the certificate is used, the load balancer submits a request to the certificate manager to remove a value from the data structure, the value establishing a relation between the certificate and the load balancer.

12. The system of claim 9, wherein the certificate manager is configured to grant permission to the load balancer to decrypt the private key.

13. The system of claim 6, wherein the certificate manager is configured to update a data structure to bind the certificate to the load balancer and to subsequently update the data structure to unbind the certificate from the load balancer.

14. The system of claim 6, wherein the certificate manager is configured to:
determine that the certificate is bound to the load balancer;
confirm ownership of a domain of the load balancer; and
generate a certificate signing request to renew the certificate, the certificate signing request includes an indication that the domain's ownership has been confirmed.

15. The system of claim 6, wherein the certificate signing request includes an expiration value that is set by the certificate manager, not the customer.

16. A computer-implemented method, comprising:
on a service provider network comprising a plurality of computing devices:
receiving a service provider customer request for a certificate;
without customer involvement, generating a public key, private key pair;
without customer involvement, generating a certificate signing request to include the public key, customer information, and an expiration value;
without customer involvement, transmitting the certificate signing request to a certificate authority;
without customer involvement, storing a certificate from the signing authority;
upon receipt of a customer request for security, binding the certificate to a customer-specified load balancer of a service provider network; and
without customer involvement, renewing the certificate before its expiration.

17. The computer-implemented method of claim 16, further comprising encrypting the private key and storing the encrypted private key in a database, and wherein storing the certificate comprising storing the certificate in the database with the encrypted private key.

18. The computer-implemented method of claim 17, further comprising granting permission to the load balancer to decrypt the encrypted private key.

19. The computer-implemented method of claim 16, wherein receiving the request for the certificate comprises receiving the request by way of a management console, a command line interface, or an application programming interface.

20. The computer-implemented method of claim 16, wherein upon receipt of the customer request for security, storing a relation value along with the certificate, the relation value indicative of which load balancer is to be bound with the certificate.

21. The computer-implemented method of claim 16, further comprising unbinding the certificate from the customer-specified load balancer.

* * * * *